(12) United States Patent
Ajioka et al.

(10) Patent No.: US 8,152,611 B2
(45) Date of Patent: *Apr. 10, 2012

(54) GAME PROGRAM

(75) Inventors: Yoshitaka Ajioka, Kyoto (JP); Yasushi Ebisawa, Kyoto (JP); Kiyoshi Mizuki, Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,608

(22) Filed: Oct. 21, 2009

(65) Prior Publication Data

US 2010/0041478 A1 Feb. 18, 2010

Related U.S. Application Data

(63) Continuation of application No. 11/253,629, filed on Oct. 20, 2005, now Pat. No. 7,628,698.

(30) Foreign Application Priority Data

Oct. 29, 2004 (JP) .................................. 2004-317253

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/3; 463/30; 463/31; 463/32; 463/33

(58) Field of Classification Search .................. 463/3
See application file for complete search history.

(56) References Cited

U.S. PATENT DOCUMENTS

| | | | |
|---|---|---|---|
| 5,734,807 A | 3/1998 | Sumi | 345/427 |
| 5,830,066 A | 11/1998 | Goden et al. | 463/33 |
| 5,947,819 A | 9/1999 | Ohshima | 463/2 |
| 6,468,157 B1 * | 10/2002 | Hinami et al. | 463/32 |
| 6,720,949 B1 | 4/2004 | Pryor et al. | 345/158 |
| 6,887,157 B2 * | 5/2005 | LeMay et al. | 463/32 |
| 7,223,169 B2 * | 5/2007 | Imaeda et al. | 463/3 |
| 2001/0052110 A1 | 12/2001 | Orbanes et al. | 717/1 |
| 2004/0102245 A1 | 5/2004 | Escalera et al. | 463/32 |
| 2005/0010876 A1 | 1/2005 | Robertson et al. | 715/782 |

FOREIGN PATENT DOCUMENTS

JP 2002-939 1/2002

* cited by examiner

*Primary Examiner* — Dmitry Suhol
*Assistant Examiner* — Kevin Y Kim
(74) *Attorney, Agent, or Firm* — Nixon & Vanderhye PC

(57) ABSTRACT

A CPU core determines whether a stick is in contact with a touch panel based on an output signal from the touch panel; if not in contact, a gazing point of a virtual camera is moved to a collective center of masses for objects; on the other hand, if the stick is in contact with the touch panel, setting values for the camera are fixed, an operation target object is caused to appear at a position, in a game space, corresponding to touch coordinates, and, then, the operation target object is moved in accordance with a dragging operation from a player; the setting values for the camera are fixed until the stick detaches from the touch panel; and, accordingly, when the player moves an arbitrary object in the three dimensional game space by operating the touch panel, the player can accurately move the object to an intended point.

26 Claims, 14 Drawing Sheets

GAME PROGRAM

CROSS REFERENCE TO RELATED APPLICATIONS

This application is a continuation of application Ser. No. 11/253,629, now allowed, filed Oct. 20, 2005, entitled "Game Program" which claims the benefit of priority from JP 2004-317253 filed Oct. 29, 2004. The entire disclosures of each of these applications are hereby incorporated herein by reference.

TECHNICAL FIELD

The exemplary embodiments disclosed herein relate to a game program, and particularly, relate to a game program for displaying an object placed in a three dimensional game space in a display device provided with a touch panel, based on a virtual camera provided in the game space.

BACKGROUND AND SUMMARY

Conventionally, it has been known that there exists a game apparatus displaying a three dimensional game space on a display screen, and, by operating a touch panel provided on the display screen, allows an input operation for a game (for example, refer to FIG. 23 in Japanese Laid-Open Patent Publication 2002-939 (hereinafter, referred to as "Patent Document 1")). In the game apparatus described in Patent Document 1, a player character placed in the three dimensional game space has a sword, and a user can operate the sword by touching the touch panel. Specifically, the user can let the player character slash an enemy by touching the position of the sword displayed on the touch panel, and moving (dragging), while maintaining the contact on the touch panel, his or her finger to a position where the enemy is displayed.

In the game apparatus described in the aforementioned Patent Document 1, displayed on the display screen is the three dimensional game space being viewed from a virtual camera provided in the game space. However, in the game apparatus described in the aforementioned Patent Document 1, it is conceivable that a direction of the virtual camera (namely, a gazing point) is automatically controlled such that, for example, the gazing point of the virtual camera always focuses on a middle point between the player character and the enemy. In such a case, however, a following problem emerges.

In the case where the direction of the virtual camera is automatically controlled such that the gazing point of the virtual camera always focuses on the middle point between the player character and the enemy, according to a movement of the player character or the enemy, the direction of the virtual camera rapidly changes. It follows that, according to the change in the direction of the virtual camera, positions of the player character, the sword possessed by the player character, and the enemy displayed on the display screen also rapidly change. As a result, when the user tries to drag the sword to the position of the enemy by using the touch panel, there is a problem that an accurate dragging to the position of the enemy is difficult due to the rapid change in the position of the enemy. Predicting the movement of the enemy swiftly moving in the game space so as to hit the enemy with the sword leads to an enhancement of a sense of entertainment in the game. However, even if the user can predict a point to which the enemy moves in the game space, where on the display screen the point is displayed depends on a position of the virtual camera, and therefore, if the direction of the virtual camera rapidly changes, the sense of entertainment in attacking the enemy by predicting the movement of the enemy is lost. For example, as in FIG. 16A, even if a player makes a prediction concerning a point to which the enemy moves, and drags the sword of the player character toward the predicted point, the gazing point of the virtual camera shifts due to the movement of the enemy, causing, as in FIG. 16B, the player character to miss the enemy even when the prediction of the player is accurate.

Note that although the above described example illustrates a case where the direction of the virtual camera automatically changes such that the gazing point of the virtual camera always focuses on the middle point between the player character and the enemy, similar problems emerge when a position or an angle of view of the virtual camera changes.

Therefore, a feature of certain exemplary embodiments is to provide a game program allowing, when a player designates an arbitrary point in a three dimensional game space by using a touch panel, the point which is intended by the player to be accurately designated.

In order to solve the above problem, certain exemplary embodiments employ the following configuration. Reference numerals and figure numbers in parentheses show a corresponding relationship with the drawings to help understand the exemplary embodiments, and are not in anyway limiting the scope of the present invention.

A first aspect of certain exemplary embodiments is directed to a storage medium storing a game program for displaying, on a display device (12) provided with a touch panel (15), objects (OB1 to OB3) placed in a three dimensional game space, based on a virtual camera (VC) provided in the game space.

The game program is a program for causing a computer (21) to execute: a camera control step (S21); a game image generation step (S35); a touch coordinates detection step (S15); a camera fixing step (S23); and a designation coordinates calculation step (S25).

The camera control step is a step of changing a setting value for the camera, the value indicative of at least one of a position (40a), a gazing point (40b), and an angle of view (40c) of the virtual camera; the game image generation step is a step of generating a game image to be displayed on the display device by drawing the objects based on the setting value for the camera; the touch coordinates detection step is a step of detecting touch coordinates (42) indicative of a touched position on the touch panel based on an output signal from the touch panel; the camera fixing step is a step of fixing, when the touch coordinates are detected while the setting value for the camera is changing, the setting value for the camera such that the value remains unchanged at least until the detection for the touch coordinates stops; and the designation coordinates calculation step is a step of sequentially calculating, when the touch coordinates are changed, in a state where the setting value for the camera is fixed, three dimensional coordinates, in the game space, corresponding to the changed touch coordinates, and accepting the outcome as designation coordinates (43) designated by a player.

In a second aspect based on the first aspect, the game program causes the computer to further execute an operation target object placement step (S29) and an operation target object movement step (S33).

The operation target object placement step is a step of placing, when the touch coordinates are detected while the setting value for the camera is changing, an operation target object (CT1) on the three dimensional coordinates, in the game space, corresponding to the touch coordinates; and the operation target object movement step is a step of moving the operation target object in accordance with a change in the designation coordinates sequentially calculated in the designation coordinates step.

In a third aspect based on the first aspect, the designation coordinates calculation step calculates the designation coordinates corresponding to the touch coordinates detected in the touch coordinates detection step by mapping each point on the touch panel to a predetermined plane (VS) set in a view volume in the game space (FIG. 12).

In a fourth aspect based on the first aspect, the camera control step changes the setting value for the camera per unit time, based on a predetermined computational expression (S19).

A fifth aspect is directed to a storage medium storing a game program for displaying, on a display device (12) provided with a touch panel (15), objects (OB1 to OB3) placed in a three dimensional game space, based on a virtual camera (VC) provided in the game space.

The game program is a program for causing a computer (21) to execute: a first camera control step (S21); a game image generation step (S35); a touch coordinates detection step (S15); an object determination step (S45); a camera fixing step (S47); a designation coordinates calculation step (S41); and an operation target object movement step (S53).

The first camera control step is a step of changing a setting value for the camera, the value indicative of at least one of a position (40a), a gazing point (40b), and an angle of view (40c) of the virtual camera; the game image generation step is a step of generating a game image to be displayed on the display device by drawing the objects based on the virtual camera; the touch coordinates detection step is a step of detecting touch coordinates (42) indicative of a touched position on the touch panel based on an output signal from the touch panel; the object determination step is a step of determining whether an operation target object (CT2) is displayed at a position, on a screen of the display device, corresponding to the touch coordinates, based on the touch coordinates detected in the touch coordinates detection step; the camera fixing step is a step of fixing, when the operation target object is determined, in the object determination step, as being displayed at the position, on the screen of the display device, corresponding to the touch coordinates while the setting value for the camera is changing, the setting value for the camera such that the value remains unchanged at least until the detection for the touch coordinates stops; the designation coordinates calculation step is a step of sequentially calculating, when the touch coordinates are changed, in a state where the setting value for the camera is fixed, three dimensional coordinates, in the game space, corresponding to the changed touch coordinates, and accepting the outcome as designation coordinates (43) designated by a player; and the operation target object movement step is a step of updating a position of the operation target object in the game space in accordance with a change in the designation coordinates sequentially calculated in the designation coordinates calculation step.

In a sixth aspect based on the fifth aspect, the game program causes the computer to further execute a second camera control step (S51) of changing, when the operation target object is determined, in the object determination step, as not being displayed at the position, on the screen of the display device, corresponding to the touch coordinates while the setting value for the camera is changing, the setting value for the camera in accordance with the touch coordinates.

In a seventh aspect based on the fifth aspect, the camera control step changes the setting value for the camera per unit time, based on a predetermined computational expression (S19).

According to the above-described first aspect, when the touch coordinates are detected, the setting value for the camera is temporarily fixed at least until the detection for the touch coordinates stops, and therefore, when the player tries to designate a desired point in the game space by using the touch panel, the display position thereof is not changed, thereby allowing the player to swiftly and accurately designate the desired point in the game space.

According to the above-described second aspect, when the touch coordinates are detected, the setting value for the camera is temporarily fixed at least until the detection of the touch coordinates stops, and therefore, when the player tries to move an operation target object to the desired point in the game space by using the touch panel, the display position thereof is not changed, thereby allowing the player to swiftly and accurately move the operation target object to the desired point in the game space.

According to the above-described third aspect, by mapping the touch coordinates to a virtual plane in the game space, two dimensional touch coordinates can be converted to three dimensional coordinates in the game space.

According to the above-described fourth aspect, the setting value for the camera can be automatically controlled based on a predetermined algorithm. Even in such a case, when the touch coordinates are detected, the setting value for the camera is temporarily fixed at least until the detection for the touch coordinates stops, and therefore, when the player tries to designate a desired point in the game space by using the touch panel, the display position thereof is not changed, thereby allowing the player to swiftly and accurately designate the desired point in the game space.

According to the above-described fifth aspect, when the operation target object is displayed at the position, on the screen of the display device, corresponding to the touch coordinates, the setting value for the camera is temporarily fixed at least until the detection for the touch coordinates stops, and therefore, when the player tries to move the operation target object to the desired point in the game space by using the touch panel, the display position thereof is not changed, thereby allowing the player to swiftly and accurately move the operation target object to the desired position in the game space.

According to the above-described sixth aspect, in addition to the effect in the fifth aspect that the operation target object can be swiftly and accurately moved to the desired position in the game space, provided is an effect in that, when the operation target object is not displayed at the position, on the screen of the display device, corresponding to the touch coordinates, the setting value for the camera changes according to the touch coordinates, thereby allowing the player to change the setting value for the camera by using the touch panel.

According to the above-described seventh aspect, the setting value for the camera can be automatically controlled based on the predetermined algorithm. Even in such a case, when the operation target object is displayed at the position, on the screen of the display device, corresponding to the touch coordinates, the setting value for the camera is temporarily fixed at least until the detection for the touch coordinates stops, and therefore, when the player tries to move the operation target object to the desired point in the game space by using the touch panel, the display position thereof is not changed, thereby allowing the player to swiftly and accurately move the operation target object to the desired position in the game space.

These and other features, aspects and advantages of the present invention will become more apparent from the following detailed description of certain exemplary embodiments when taken in conjunction with the accompanying drawings.

DETAILED DESCRIPTION

Hereinafter, a construction and an operation of a game apparatus according to an exemplary embodiment are described.

Figure 1:
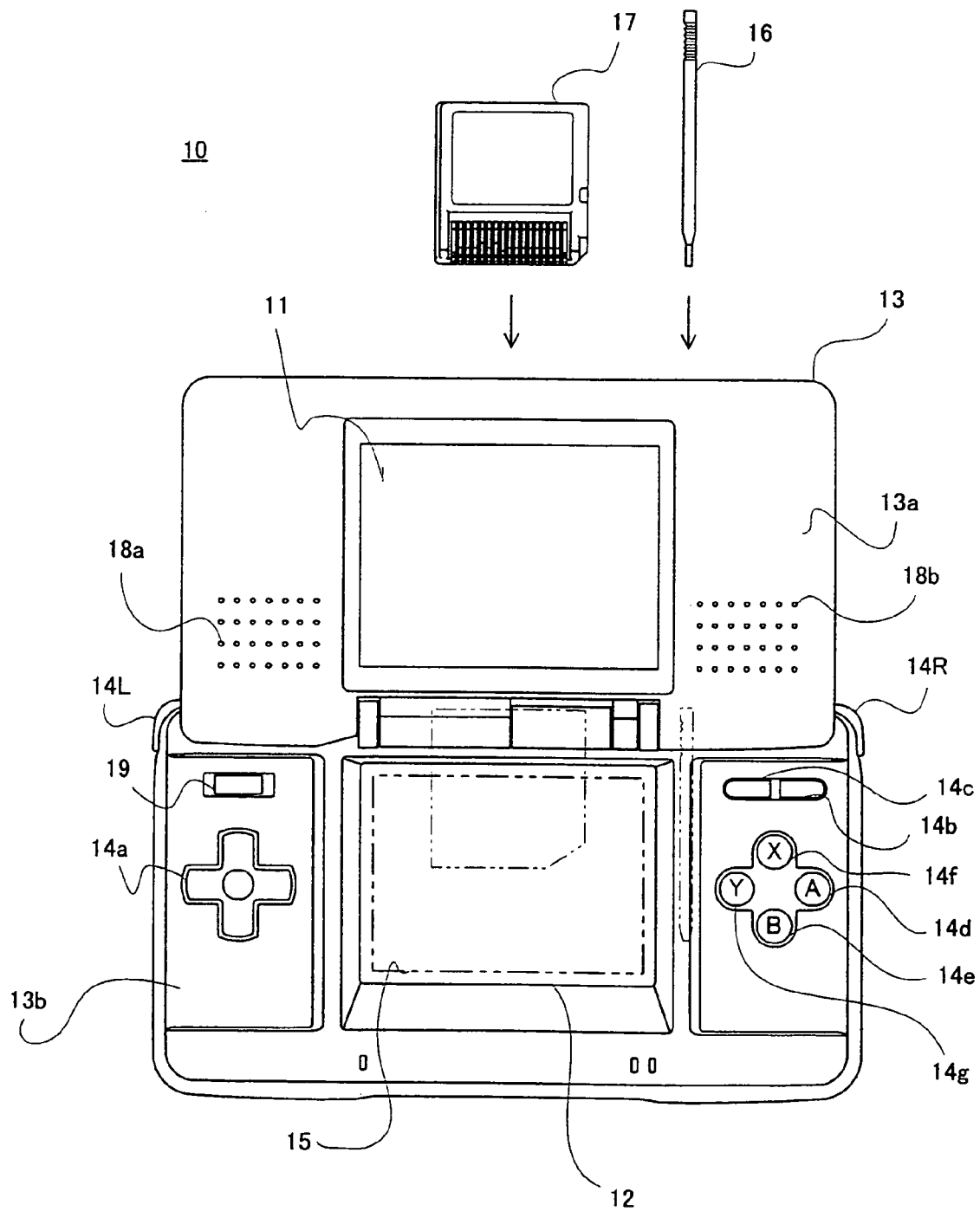
FIG. 1 is a view showing an outer appearance of a game apparatus according to an exemplary embodiment.

FIG. 1 is a view illustrating an outer appearance of the game apparatus according to an exemplary embodiment. In FIG. 1, a game apparatus 10 includes a first Liquid Crystal Display (LCD: liquid crystal display device) 11, and a second LCD 12. A housing 13 is provided with an upper housing 13a and a lower housing 13b, the first LCD 11 is accommodated in the upper housing 13a, and the second LCD 12 is accommodated in the lower housing 13b. A resolution for each of the first LCD 11 and the second LCD 12 is 228 dots×192 dots. In the present embodiment, an LCD is used as a display device, but another arbitrary display device such as, for example, a display device using an Electro Luminescence (EL: Electroluminescence) or the like can be employed. Also, an arbitrary resolution can be employed.

In the upper housing 13a, provided are sound holes 18a and 18b for outputting a sound from a pair of loudspeakers (30a and 30b in FIG. 2) described later.

In the lower housing 13b, provided as input devices are a cross switch 14a, a start switch 14b, a select switch 14c, an A button 14d, a B button 14e, an X button 14f, an Y button 14g, an L button 14L, and an R button 14R. Also, as further input devices, a touch panel 15 is provided on a screen of the second LCD 12. Also, in the lower housing 13b, insertion slots for accommodating a power switch 19, a memory card 17, and a stick 16 are also provided.

As for the touch panel 15, an arbitrary type such as, for example, a resistive film type, an optical type (infrared type), or a capacitive coupling type can be employed. The touch panel 15 has a function of outputting, when a surface thereof is touched by the stick 16, coordinate data corresponding to the touched position. Hereinafter, although the description takes place based on an assumption that a player operates the touch panel 15 with the stick 16, it is certainly possible to operate the touch panel 15 with a pen (stylus pen) or a finger instead of the stick 16. In the present embodiment, the touch panel 15 having, similar to the resolution of the second LCD 12, a resolution (detection accuracy) of 228 dots×192 dots is employed. Note that the resolution for the touch panel 15 and that for the second LCD 12 do not always need to be matched.

The memory card 17 is a storage medium storing a game program therein, and detachably inserted to the insertion slot provided in the lower housing 13b.

Figure 2:
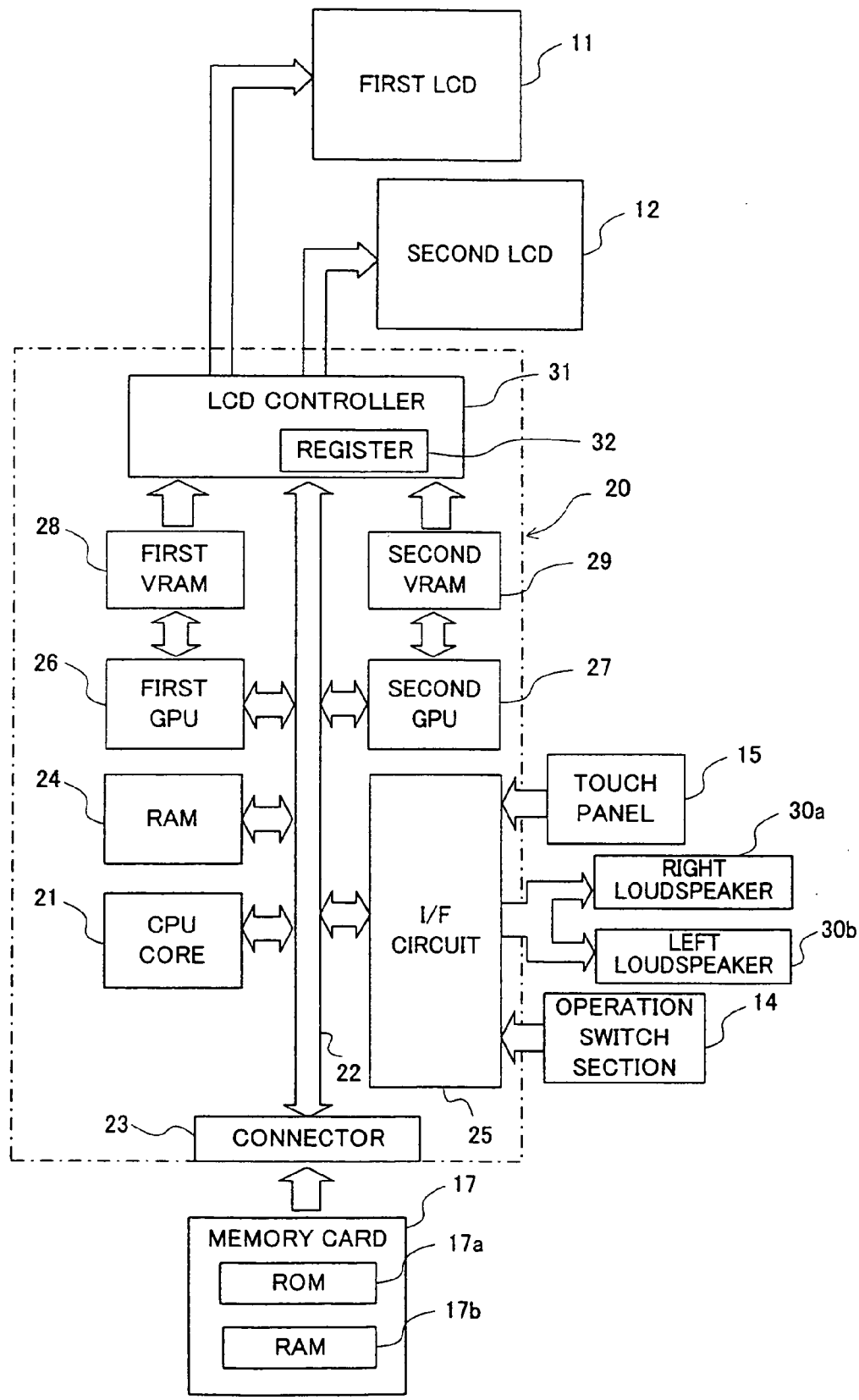
FIG. 2 is an internal structure of the game apparatus.

Next, referring to FIG. 2, an internal structure of the game apparatus 10 is described.

In FIG. 2, a CPU core 21 is mounted on an electronic circuit board 20 accommodated in the housing 13. Via a bus 22, the CPU core 21 is connected to a connector 23, an input/output interface circuit (denoted as an I/F circuit in the drawings) 25, a first Graphics Processing Unit (GPU) 26, a second GPU 27, a RAM 24, and an LCD controller 31. The memory card 17 is detachably connected to the connector 23. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. In addition to the game program, stored in the RAM 24 are temporary data obtained by the CPU core 21 executing the game program and data for generating game images. The touch panel 15, a right loudspeaker 30a, a left loudspeaker 30b, and an operation switch section 14 including the cross switch 14a, the A button 14d, and the like in FIG. 1 are connected to the I/F circuit 25. The right loudspeaker 30a and the left loudspeaker 30b are respectively placed inside the sound holes 18a and 18b.

The first GPU 26 is connected to a first Video RAM (VRAM) 28, and the second GPU 27 is connected to a second VRAM 29. In accordance with an instruction from the CPU core 21, the first GPU 26 generates a first game image using the data stored in the RAM 24 for generating a game image, and writes image data into the first VRAM 28. Similarly, in accordance with an instruction from the CPU core 21, the second GPU 27 generates a second game image, and writes image data into the second VRAM 29. The first VRAM 28 and the second VRAM 29 are connected to the LCD controller 31.

The LCD controller 31 includes a register 32. The register 32 stores a value 0 or 1 in accordance with an instruction from the CPU core 21. If the value in the register 32 is 0, the LCD controller 31 outputs, to the first LCD 11, the first game image written by the first VRAM 28, and outputs, to the second LCD 12, the second game image written by the second VRAM 29.

If the value in the register 32 is 1, the LCD controller 31 outputs, to the second LCD 12, the first game image written by the first VRAM 28, and outputs, to the first LCD 11, the second game image written by the second VRAM 29.

Note that the above described structure of the game apparatus 10 is merely an example, and certain exemplary embodiments can be applied to an arbitrary computer system having at least one display device provided with a touch panel on a screen. Further, the game program of certain exemplary embodiments may not only be supplied to a computer system via an external storage medium such as the memory card 17 or the like, but may also be supplied to the computer system via a wired or a wireless communication line, or may also be previously stored in a nonvolatile storage apparatus inside the computer system.

Hereinafter, with reference to exemplary game images, an outline for a game executed by the game apparatus 10 in accordance with the game program is described.

Figure 3A:
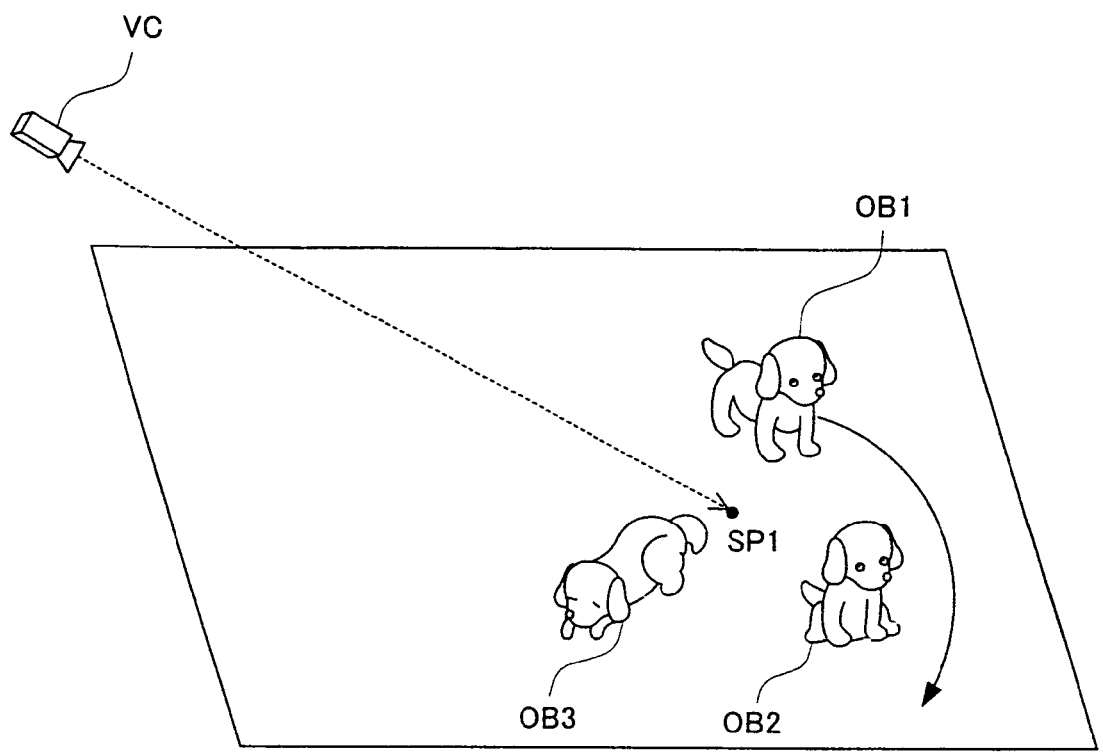
FIG. 3A is a diagram illustrating a state of a games pace.
Figure 3B:
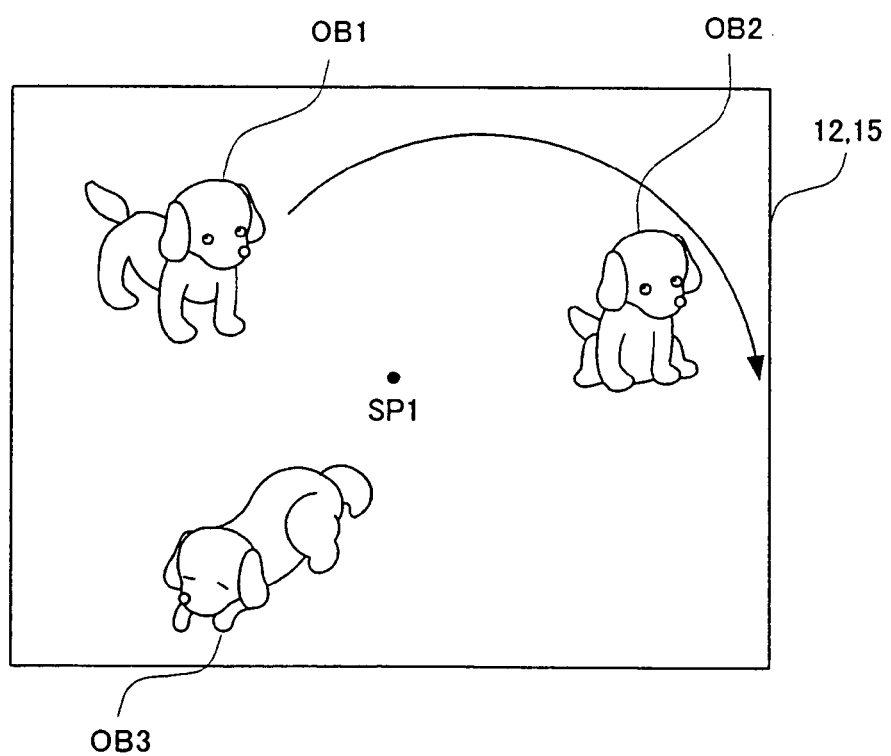
FIG. 3B is an exemplary game image corresponding to FIG. 3A.

A state of a three dimensional game space is displayed on the second LCD 12. In the game space, three objects, i.e., OB1, OB2, and OB3, representing dogs and a virtual camera VC are placed as shown in FIG. 3A. The objects OB1, OB2, and OB3 move or perform a predetermined action in accordance with a predetermined algorithm. A gazing point of the virtual camera VC is automatically controlled such that the position of the gaze is always placed at a collective center of masses for the objects OB1, OB2, and OB3. When the objects OB1, OB2, and OB3 are placed as shown in FIG. 3A, a game image, such as shown in FIG. 3B, having its center where the collective center of masses for the objects OB1, OB2, and OB3 is (here, SP1) is displayed on the second LCD 12. As such, through automatically shifting the gazing point of the virtual camera VC to a position of the collective center of masses for the objects OB1, OB2, and OB3, the three objects OB1, OB2, and OB3 are always displayed on the second LCD 12 in a well balanced manner.

Figure 4A:
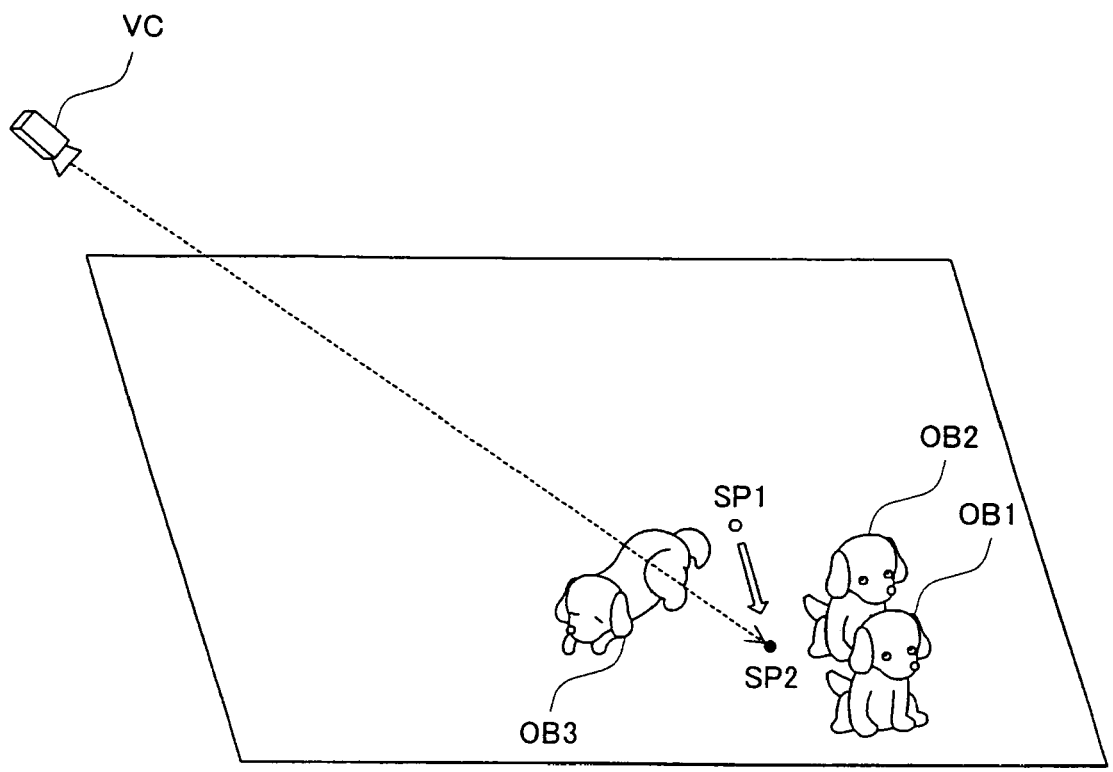
FIG. 4A is a diagram illustrating a state of the game space.
Figure 4B:
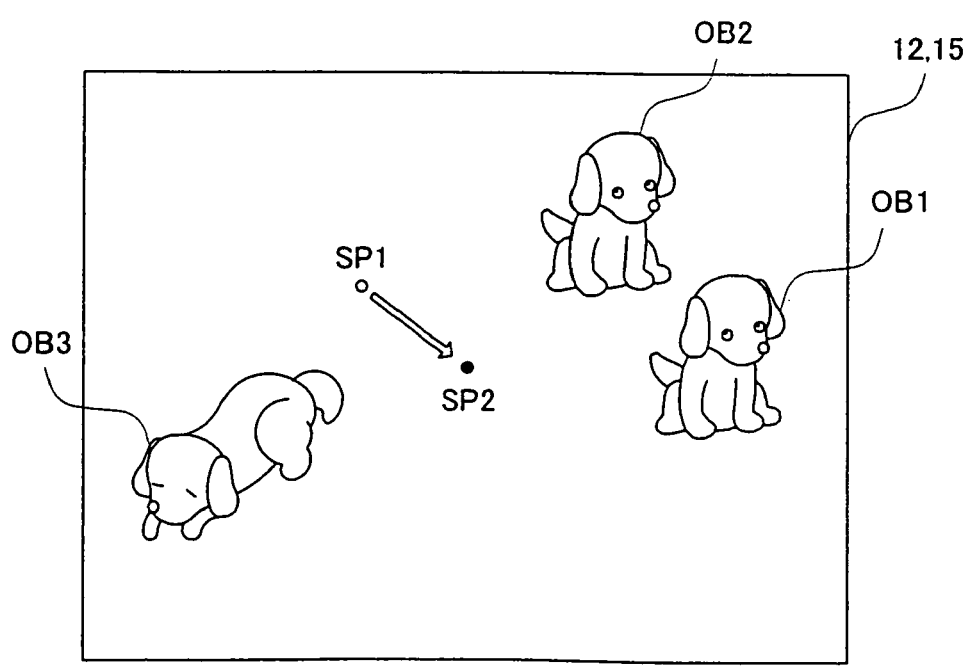
FIG. 4B is an exemplary game image corresponding to FIG. 4A.

Here, when the object OB1 moves from the position shown in FIG. 3A to a position pointed by an arrow shown in FIG. 3A, the gazing point of the virtual camera VC shifts from the SP1 to SP2, as illustrated in FIG. 4A. As a result, the game image displayed on the second LCD 12 changes from the image displayed in FIG. 3B to that in FIG. 4B. Note that, although, in the game space, the objects OB2 and OB3 are not moved at all, displayed positions for the objects OB2 and OB3 on the screen of the second LCD 12 are changed as a consequence to the change in the gazing point of the virtual camera.

In the present embodiment, a player can give a dog a piece of meat with bone by operating the touch panel 15. Hereinafter, described is a case where a piece of meat with bone is given to the object OB3, for example.

Figure 5:
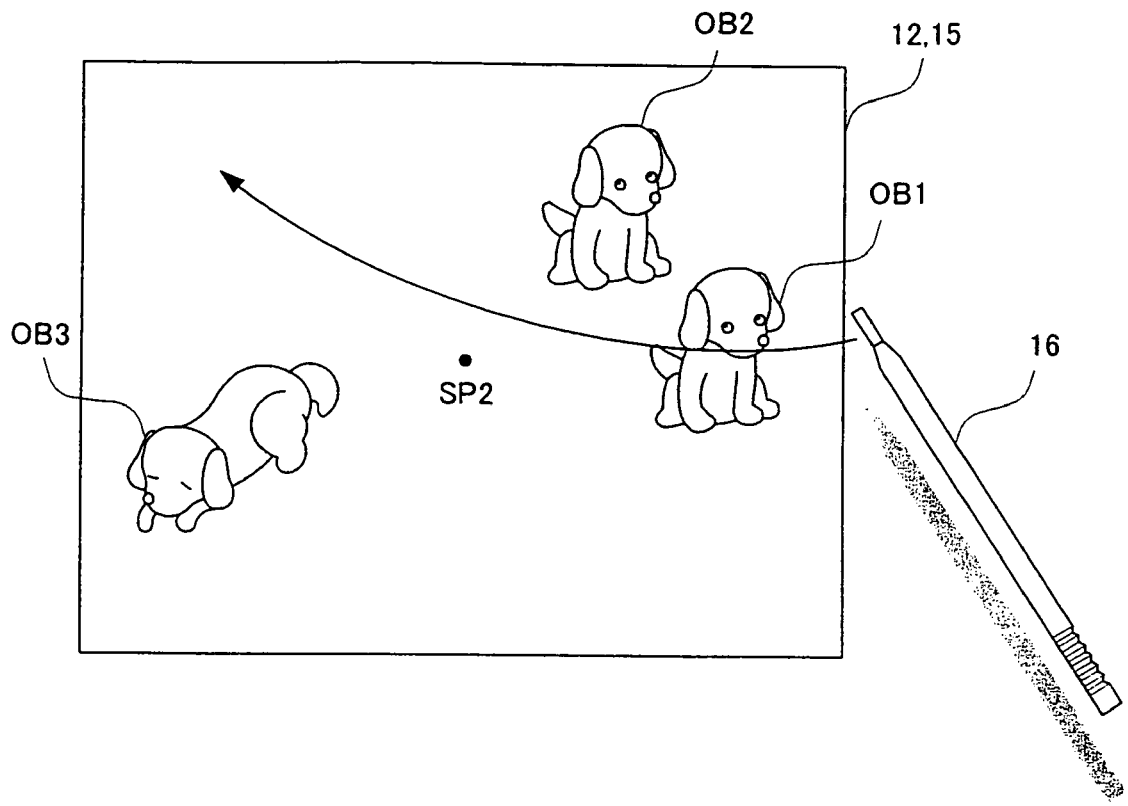
FIG. 5 is an exemplary game image immediately before a stick is brought into contact with a touch panel.

In order to let a piece of meat with bone appear in the game space, the player touches at an arbitrary point on the touch panel 15 with the stick 16. Here, it is assumed that the stick is brought into contact with a point at which an arrow shown in FIG. 5 points.

Figure 6:
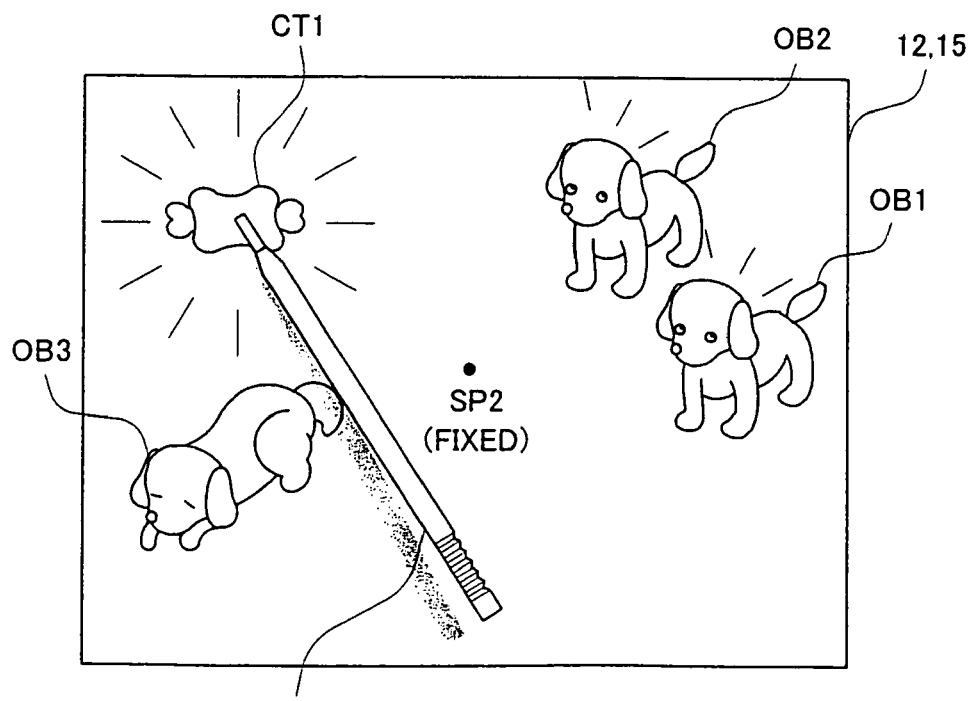
FIG. 6 is an exemplary game image immediately after the stick is brought into contact with the touch panel.

When the player touches the touch panel 15 with the stick 16, an object CT1 representing a piece of meat with bone is displayed at a position, on the screen of the second LCD 12, corresponding to the touched position, as shown in FIG. 6. The position of the object CT1 is controlled by an operation from the player, and therefore, hereinafter, the object CT1 is referred to as an operation target object CT1.

When the player touches on the touch panel 15 with the stick 16, the operation target object CT1 appears in the game space, and, at the same time, the gazing point of the virtual camera VC which is automatically controlled to be placed at the collective center of masses for the objects OB1, OB2, and OB3 is locked for a time period until which the player detaches the stick 16 from the touch panel 15. Here, the position for the gazing point of the virtual camera VC immediately before the player touches the touch panel 15 with the stick 16 is the SP2, and therefore, the gazing point of the virtual camera VC is locked at the SP2 for the time period until which the player detaches the stick 16 from the touch panel 15. To be more precise, while the player touches on the touch panel 15 with the stick 16, not only the gazing point of the virtual camera VC, but also the position (the position of viewpoint) and the angle of view of the virtual camera VC are also locked. Accordingly, during the time period, an object which does not move at all in the game space is continuously displayed at a same position on the screen of the second LCD 12.

Figure 7:
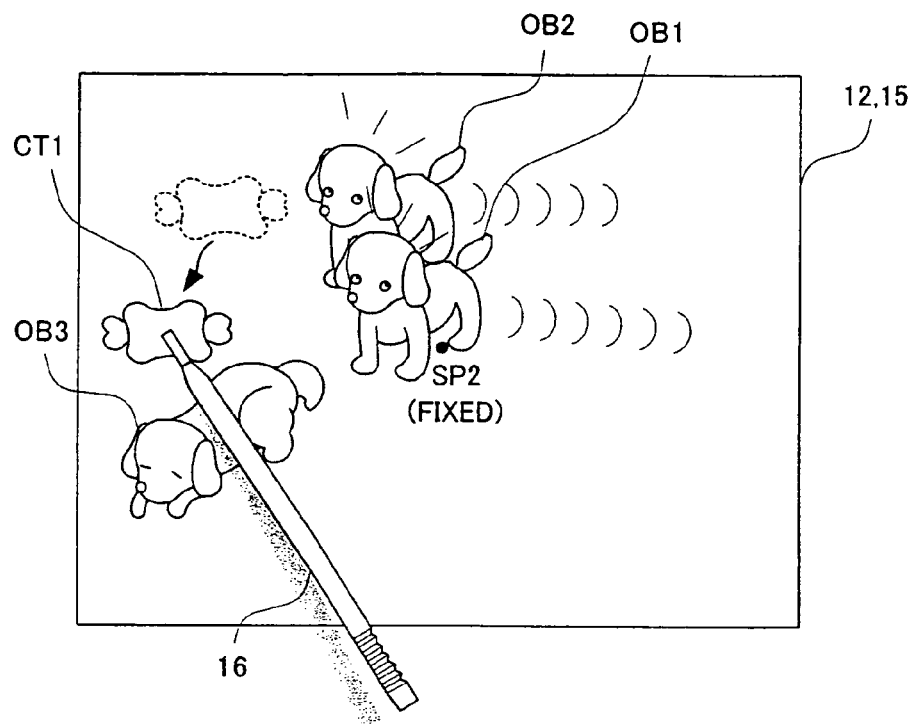
FIG. 7 is an exemplary game image during a dragging operation.
Figure 16A:
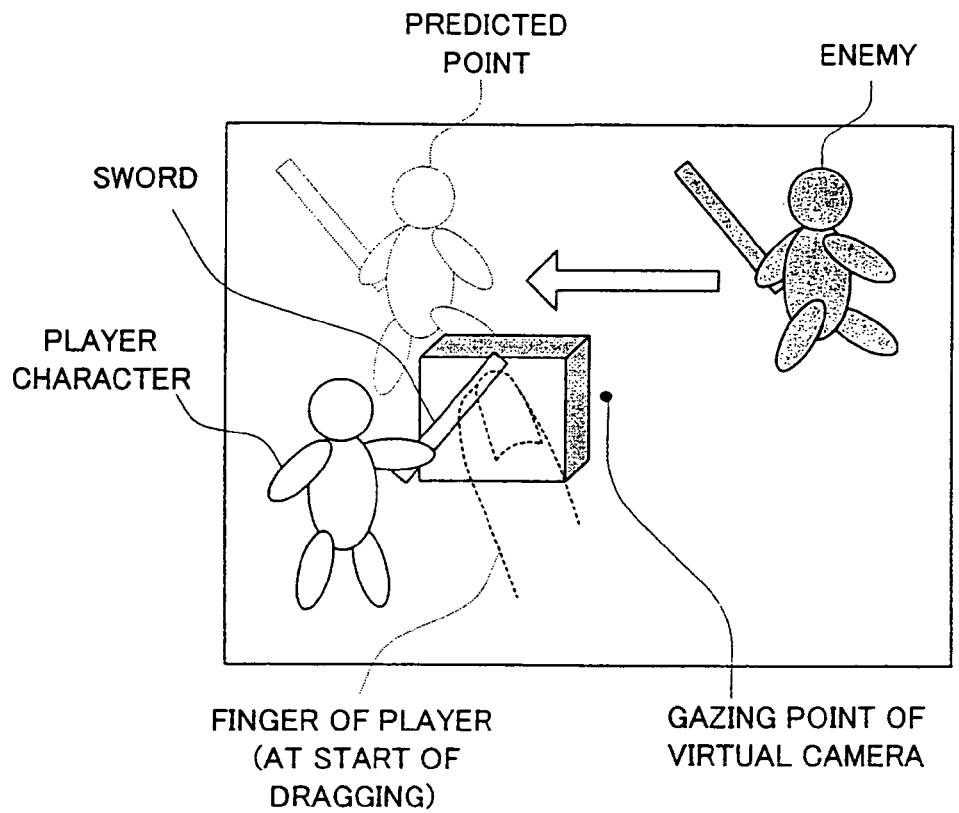
FIG. 16A is an exemplary game image of a conventional game apparatus.
Figure 16B:
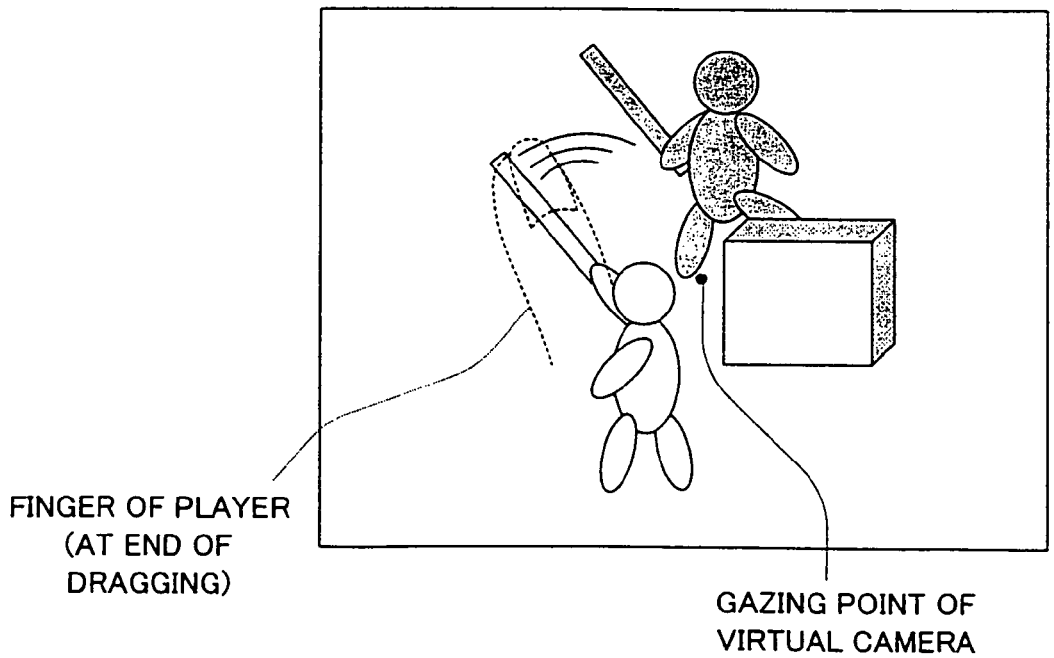
FIG. 16B is an exemplary game image of the conventional game apparatus.

When the operation target object CT1 is displayed on the second LCD 12 as in FIG. 6, the player subsequently moves the operation target object CT1 toward a mouth of the object OB3 by a dragging operation, as illustrated in FIG. 7. Note that the dragging operation is an operation in which the stick 16 is caused to move while maintaining its touch on the touch panel 15. While the player moves the operation target object CT1, the objects OB1 and OB2 move closer to the operation target object CT1, as illustrated in FIG. 7. However, because the gazing point of the virtual camera VC is locked at the SP2, even with the change in the collective center of masses for the objects OB1, OB2, and OB3, the position of the object OB3 on the screen of the second LCD 12 does not change at all. Consequently, the problem previously described with reference to FIG. 16B is not caused, allowing the player to swiftly and accurately move the operation target object CT1 to a desired position (here, the mouth of the object OB3) in the game space.

Figure 8:
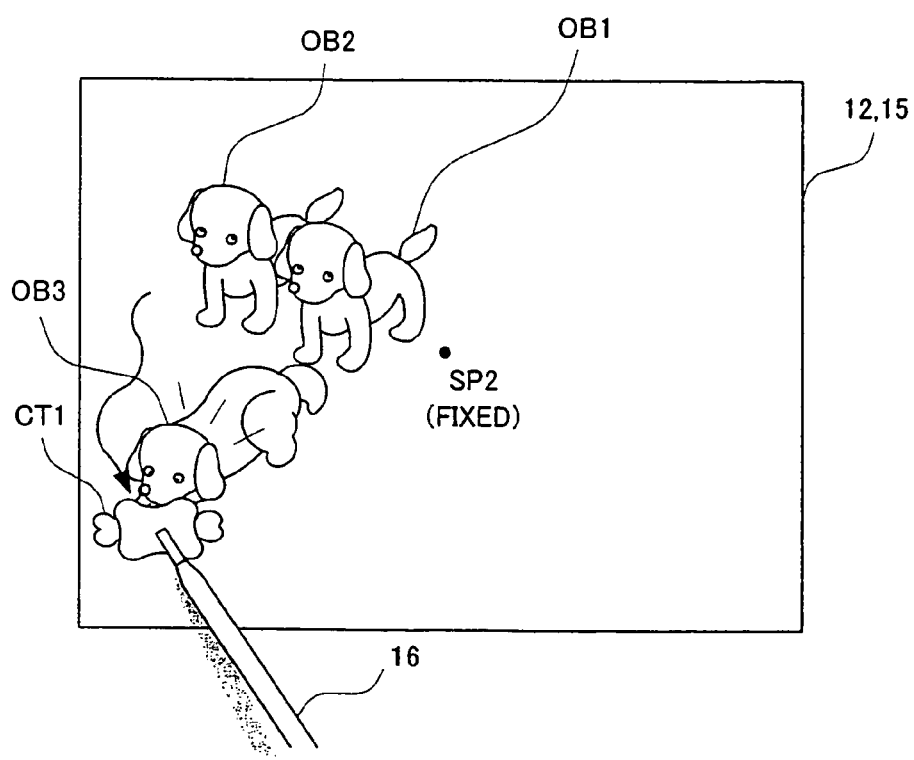
FIG. 8 is an exemplary game image immediately before the stick is detached from the touch panel.
Figure 9:
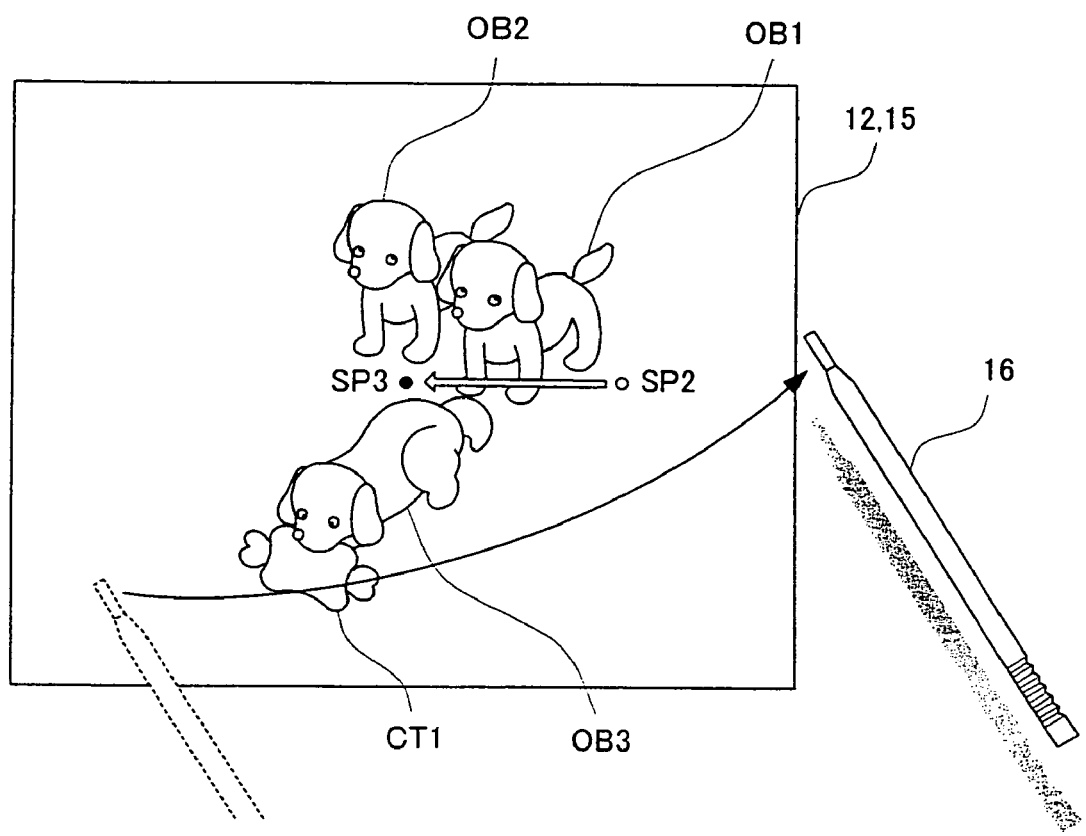
FIG. 9 is an exemplary game image immediately after the stick is detached from the touch panel.

When finish moving the operation target object CT1 to the mouth of the object OB3 as shown in FIG. 8, the player detaches the stick 16 from the touch panel 15. Then, the gazing point of the virtual camera VC having been locked at the SP2 shifts to a position where the collective center of masses for the objects OB1, OB2, and OB3 is (here, SP3). As a result, the three objects OB1, OB2, and OB3 are displayed on the screen of the second LCD 12 in a well balanced manner, as illustrated in FIG. 9.

Next, an operation of the CPU core 21 based on a game program is described in detail.

Figure 10:
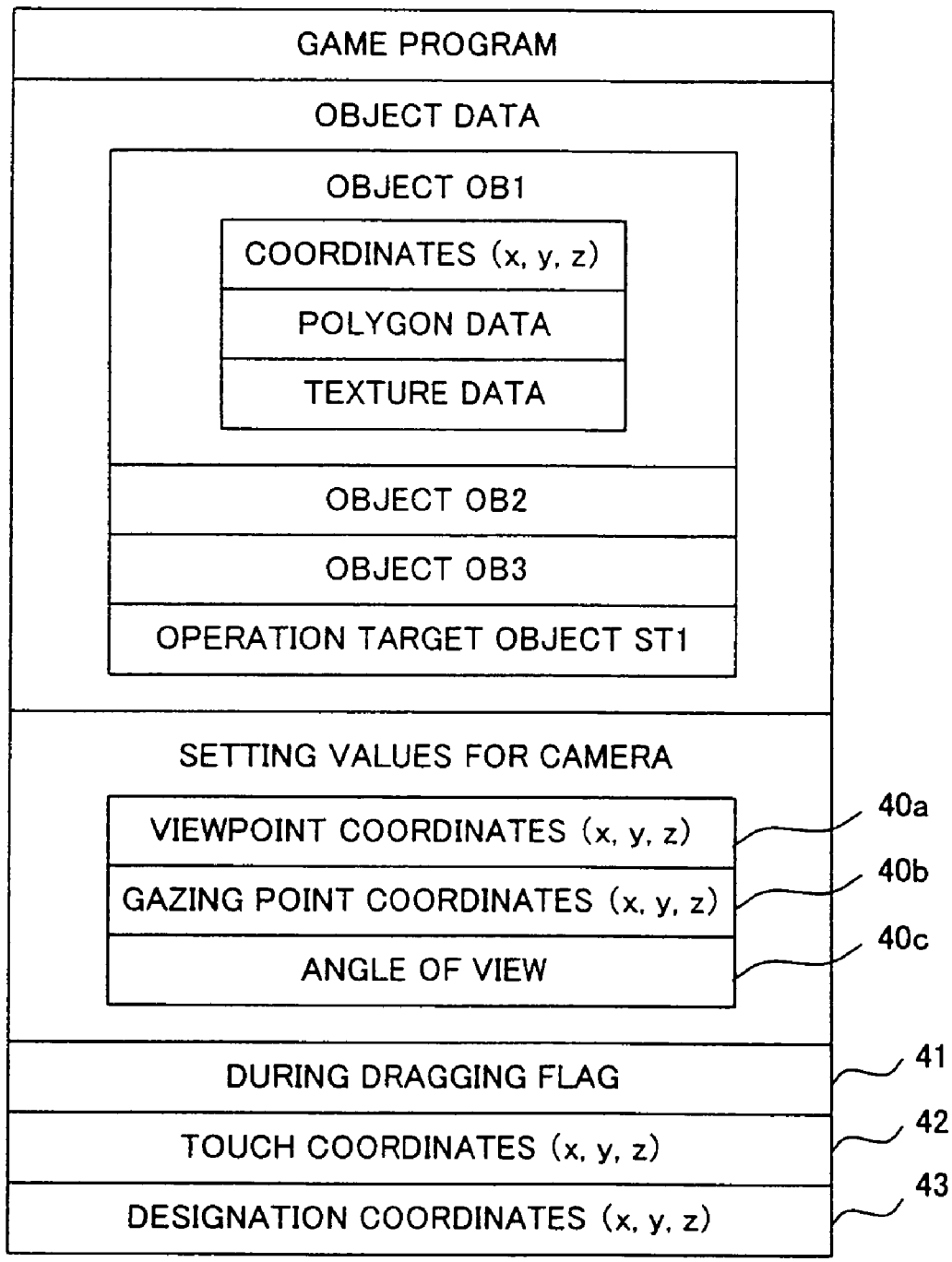
FIG. 10 is a memory map of a RAM 24.

FIG. 10 is a memory map of a RAM 24. Besides the game program read out from a ROM 17a in the memory card 17, stored in the RAM 24 are: data for each object placed in the game space; setting values for the camera; a during dragging flag 41; touch coordinates 42; and designation coordinates 43.

The game program includes a program for automatically controlling the objects OB1, OB2, and OB3, a program for automatically controlling the gazing point of the virtual camera, and a program for generating a game image based on the virtual camera.

As data for an object, coordinates (a world coordinate system) indicating a position of an object in the game space, polygon data, texture data, and the like are stored in the RAM 24.

As setting values for the camera, viewpoint coordinates (the world coordinate system) indicating a position of the virtual camera VC in the game space, gazing point coordinates (the world coordinate system) indicating a gazing point of the virtual camera VC in the game space, an angle of view of the virtual camera VC, and the like are stored in the RAM 24.

The during dragging flag 41 is a flag indicating whether a player is dragging an operation target object CT1, set to "on" when a dragging operation for the operation target object CT1 is started, and set to "off" when the dragging operation is ended.

The touch coordinates 42 are coordinates (a touch panel system) indicating a touched position of a time when the player touches the touch panel 15 with the stick 16, and stored in the RAM 24 based on an output signal from the touch panel 15 on an as-needed basis.

The designation coordinates 43 are coordinates (the world coordinate system) in the game space determined corresponding to the touch coordinates 42. A relationship associating the touch coordinates 42 with the designation coordinates 43 is described later.

Figure 11:
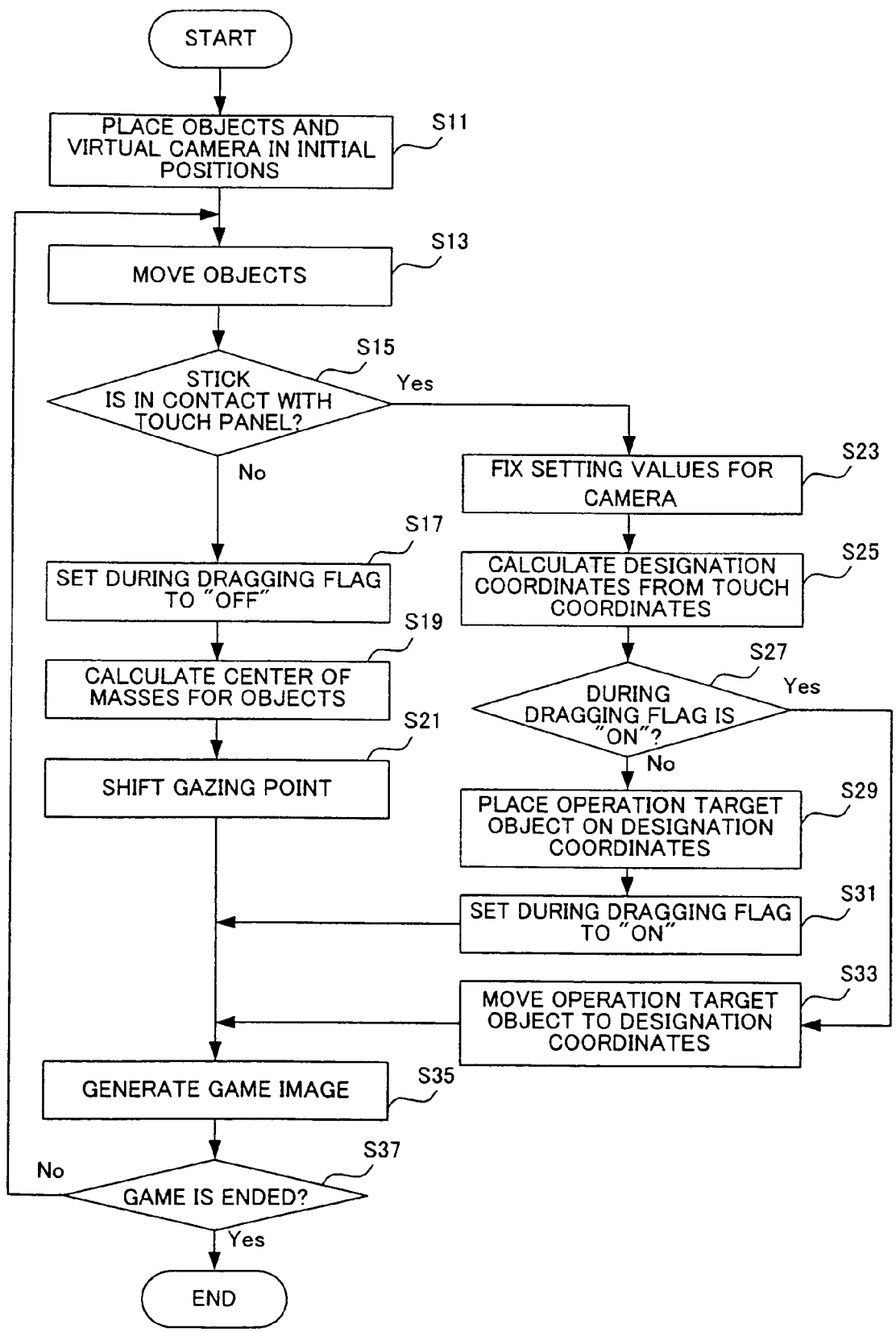
FIG. 11 is a flowchart illustrating a flow of a process for a CPU core 21 based on a game program.

Next, with reference to the flowchart in FIG. 11, a flow of a process for the CPU core 21 based on the game program is described.

Firstly, in step S11, the CPU core 21 places the objects OB1 to OB3 and the virtual camera VC in their initial positions in the game space as shown in FIG. 3A, for example.

In step S13, the objects OB1 to OB3 in the game space are moved based on a predetermined algorithm.

In step S15, whether the stick 16 is in contact with the touch panel 15 is determined based on an output signal from the touch panel 15. If the stick 16 is not in contact with the touch panel 15 (for example, states in FIGS. 5 and 9), the process proceeds to step S17, and, if in contact (for example, states in FIGS. 6, 7, and 8), the process proceeds to step S23.

In step S17, the during dragging flag 41 stored in the RAM 24 is set to "off". In step S19, coordinates for a collective center of masses for the objects OB1 to OB3 are calculated. X coordinate, Y coordinate, and Z coordinate of the center of masses are an average value for X coordinate, Y coordinate, and Z coordinate of each of the objects OB1 to OB3. In step S21, a gazing point of the virtual camera VC is moved to the center of masses calculated in step S19. Specifically, gazing point coordinates 40*b*, for the virtual camera, stored in the RAM 24 are overwritten with coordinates of the center of masses calculated in step S19. If the center of masses calculated in step S19 is substantially away from the position of the current gazing point, the gazing point coordinates 40*b* may be updated in several increments so as the gazing point to gradually approach the center of masses. After step S21, a game image is generated in step S35. The game image generated in step S35 is displayed on the second LCD 12 with an appropriate timing. In step S37, whether the game is ended is determined, and if the game has not been ended, the process returns to step S13.

In step S23, the setting values for the camera (the viewpoint coordinates 40*a*, the gazing point coordinates 40*b*, and the angle of view 40*c*) are fixed. For example, if a flag indicating whether the setting values for the camera are to be changed is provided, the flag is updated so as to prohibit a change in the setting values for the camera.

In step S25, designation coordinates are calculated using the touch coordinates 42, and the calculation result is stored in the RAM 24. An exemplary calculation method for the designation coordinates here is described with reference to FIG. 12. Each point on the touch panel 15 corresponds to each point on a virtual plane VS set within a view volume for the game space, and through mapping the touch coordinates in the touch panel coordinate system on the virtual plane VS for the game space, the designation coordinates corresponding to the touch coordinates are calculated. For example, in FIG. 12, points A1, B1, C1, and D1 on the touch panel 15 respectively correspond to points A2, B2, C2, and D2 on the virtual plane VS. Note that the view volume is a space, within the game space, which is used for drawing, and bound in accordance with a position of the virtual camera VC, a position of the gazing point, an angle of view, a near clipping plane, and a far clipping plane.

Figure 12:
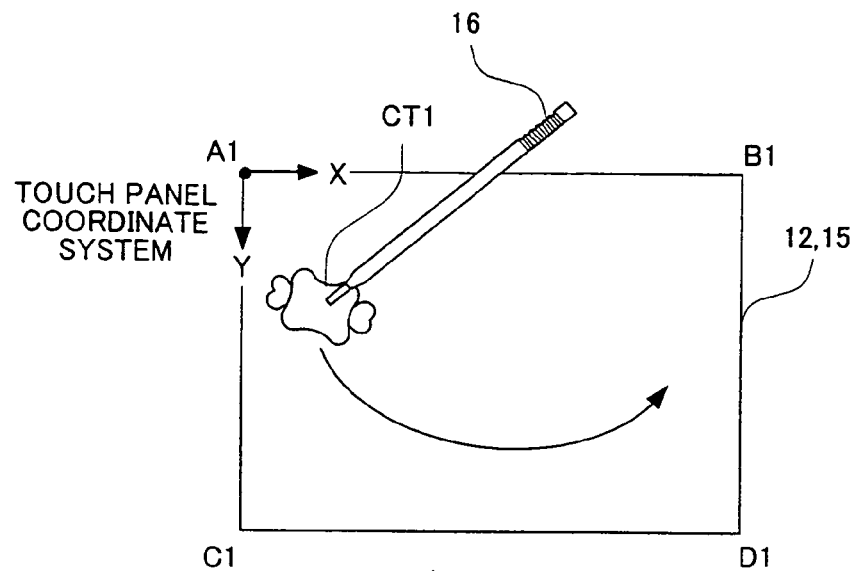
FIG. 12 is a diagram illustrating a corresponding relationship between the touch panel and a virtual plane in the game space.
Figure 12:
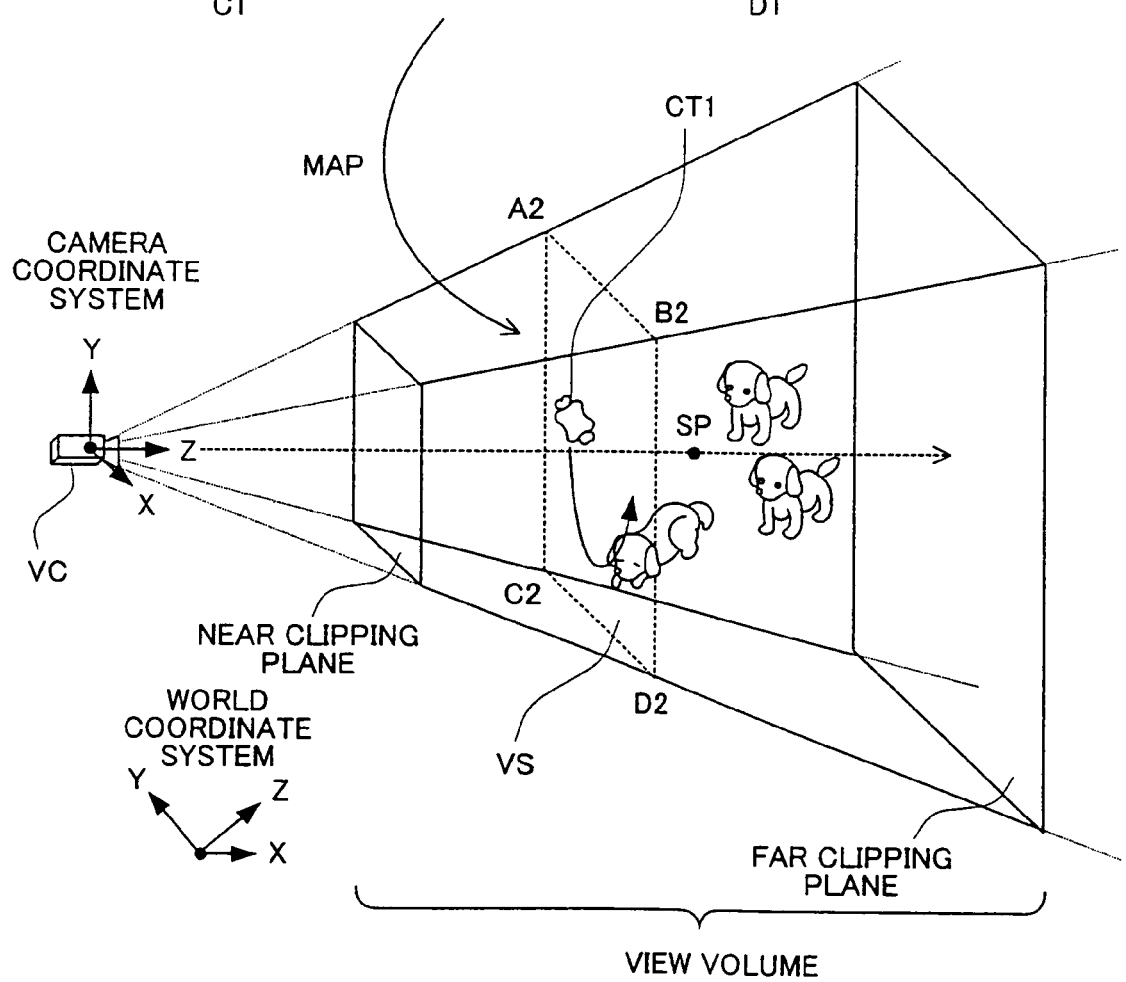

In an example shown in FIG. 12, although a plane having a predetermined Z coordinate in a camera coordinate system is defined as a virtual plane VS, the virtual plane is not limited thereto, and an arbitrary plane within the view volume may be defined as the virtual plane VS. For example, the virtual plane VS may be a curve surface. Also, the virtual plane VS may be a surface of any object (e.g., a ground) within the view volume.

In step S27, whether the during dragging flag 41 is "on" is determined. If the during dragging flag 41 is "off" (indicating a situation immediately following the stick 16 being brought into contact with the touch panel 15 as in FIG. 6), in step S29, an operation target object CT1 is placed on the designation coordinates 43 calculated in step S25, and further, the during dragging flag is set to "on" in step S31. Then, the process proceeds to step S35. Accordingly, the operation target object CT1 is displayed on a position, on the screen of the second LCD 12, corresponding to the touch coordinates, as shown in FIG. 6.

On the other hand, when it is determined that the during dragging flag 41 is "on" (indicating a situation in which the player is in a dragging operation as in FIGS. 7 and 8) in step S27, in step S33, the operation target object CT1 is moved to the designation coordinates 43 calculated in step S25, and then the process proceeds to step S35. Accordingly, the operation target object CT1 is moved to a position, on the screen of the second LCD 12, corresponding to the touch coordinates, as shown in FIGS. 7 and 8.

As described above, according to the present embodiment, while the player is, by using the touch panel 15, in a dragging operation for an operation target object, setting values for the camera are fixed, and therefore, the player can swiftly and accurately move the operation target object to a desired position in the game space.

In the present embodiment, described is an exemplary case where the player drags the operation target object CT1 by using the touch panel 15, but the present invention is not limited thereto. The exemplary embodiments can be applied to an arbitrary game requiring the player to designate, by using the touch panel 15, a desired position in the three dimensional game space. For example, the exemplary embodiments are applicable in a case of a soccer game in which a player designates a direction of a shot (e.g., right upper corner of a goal) by using the touch panel 15. In such a case, when the goal is displayed on the second LCD 12, the player firstly touches at an arbitrary position on the touch panel 15 with the stick 16, and then, while maintaining the touch on the touch panel 15 with the stick 16, the player moves the tip of the stick 16 to the right upper corner of the goal displayed on the second LCD 12, and subsequently detaches the stick 16 from the touch panel 15. As a consequence, the direction of the shot is determined based on the touch coordinates immediately before the stick 16 being detached from the touch panel 15, and a soccer athlete makes a kick to the direction of the shot. In the above described case also, the setting values for the camera are fixed during the time period between which the player, with the stick 16, touches and detaches from the touch panel 15, and therefore, even if the game advances in real time during the time period, the position of the goal displayed on the second LCD 12 is fixed, thereby allowing the player to accurately designate the direction of the shot.

Also, in the present embodiment, described is an exemplary case where, in a state in which the stick 16 is not in contact with the touch panel 15 as in steps S19 and S21 of FIG. 11, the gazing point of the virtual camera VC is automatically controlled, but the present invention is not limited thereto. In the state in which the stick 16 is not in contact with the touch panel 15, the position or the angle of view of the virtual camera VC may be automatically controlled, or the position, the gazing point, and the angle of view of the virtual camera VC may be controlled in accordance with a key operation (an input operation using an operation switch section 14) from the player.

Also, in the present embodiment, described is an exemplary case where, when the player touched the touch panel 15 with the stick 16, the gazing point is fixed to a position (SP2) which is the immediately preceding gazing point as in FIG. 6, but the present invention is not limited thereto. For example, when the player touches the touch panel 15 with the stick 16, the gazing point may be fixed at a predetermined fixing position and not the immediately preceding position of the gazing point. In such a case, when the predetermined fixing position is substantially away from the position of the gazing point that is immediately preceding the player touching the touch panel 15 with the stick 16, the gazing point coordinates 40b may be updated in several increments so as the gazing point to gradually approach the fixing position.

In the present embodiment, it is assumed that an operation target object appears in the game space only after the player touches the touch panel 15 with the stick 16, but the present invention is not limited thereto, and one or a plurality of operation target objects may be previously placed in the game space. In such a case, for example, when the player touches the touch panel 15 with the stick 16, an operation target object corresponding to the touched position is specified, and the specified operation target object may be caused to move according to a subsequent dragging operation.

Figure 13A:
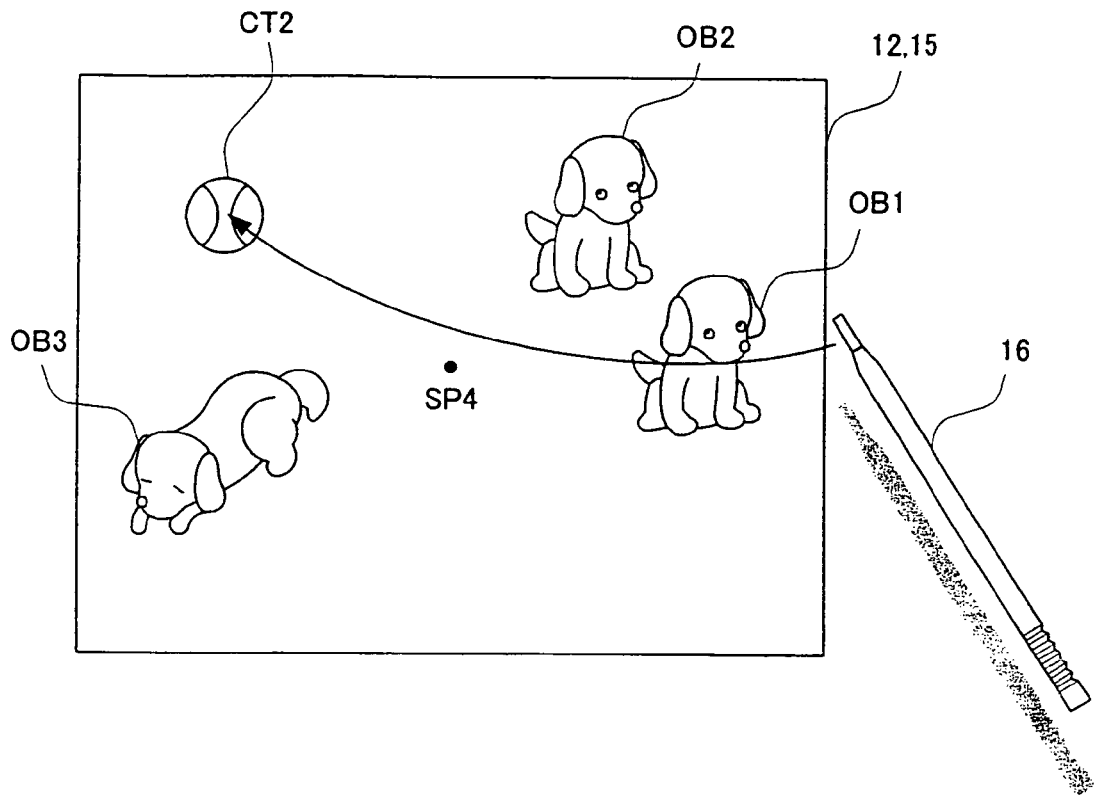
FIG. 13A is an exemplary game image immediately before an operation target object is touched.
Figure 13B:
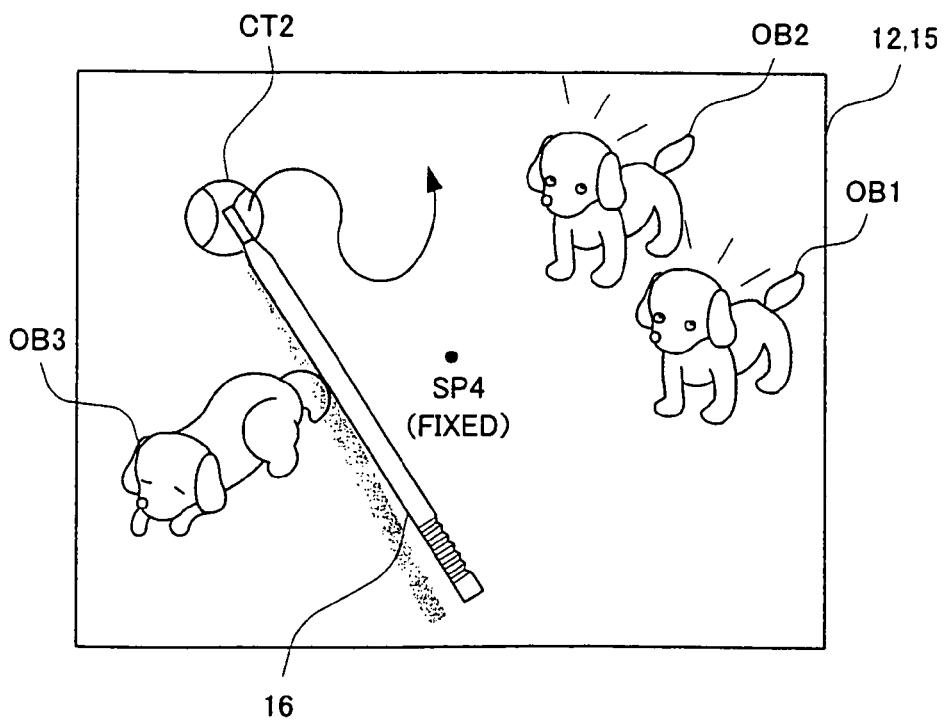
FIG. 13B is an exemplary game image immediately after the operation target object is touched.
Figure 14A:
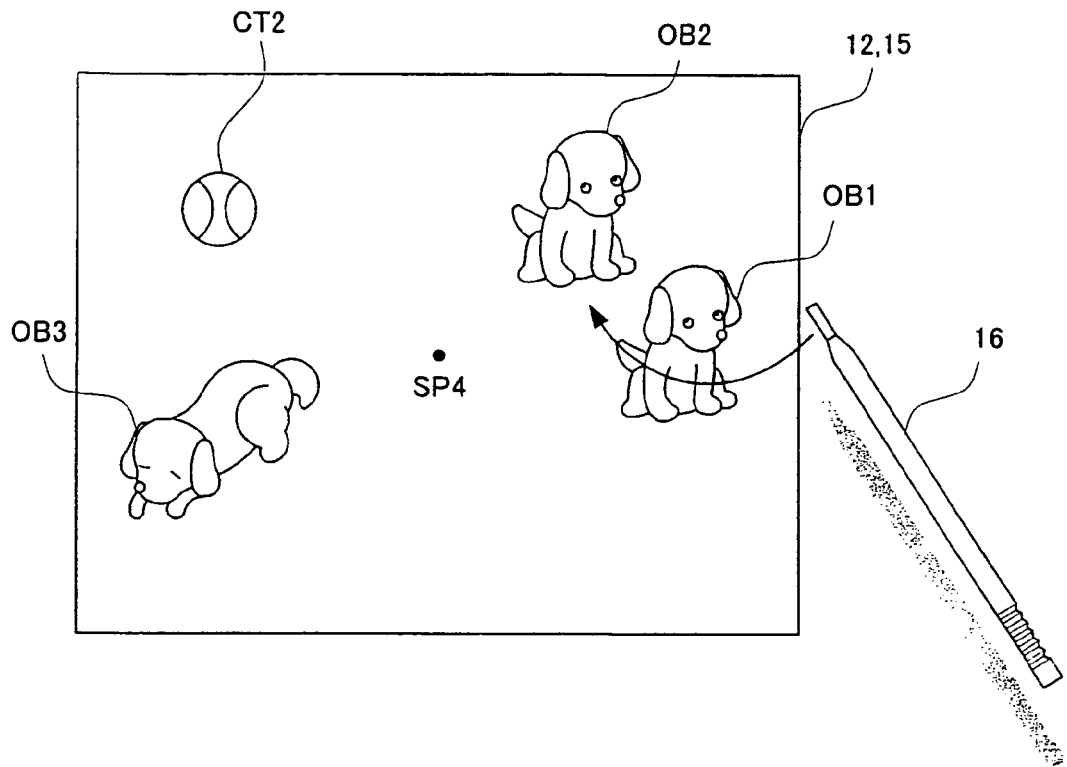
FIG. 14A is an exemplary game image immediately before a part other than the operation target object is touched.

In the aforementioned case where one or a plurality of operation target objects are previously placed in the game space, when the player touches the touch panel 15 with the stick 16, a subsequent process may be caused to be changed according to whether the operation target object is displayed at a position, on the screen of the second LCD 12, corresponding to the touched position. For example, when an operation target object CT2 representing a ball is displayed on the second LCD 12 as shown in FIG. 13A, if the stick 16 is brought into contact with the display area for the operation target object CT2, the operation target object CT2 is moved according to a subsequent dragging operation as in FIG. 13B, while keeping the setting values for the camera unchanged, and, if the stick 16 is brought into contact with a location outside the display area for the operation target object CT2 (e.g., foot of an object OB2 as in FIG. 14A), the gazing point may be moved thereto. Hereinafter, with reference to FIG. 15, a process for the CPU core 21 in the above case is described. Steps not shown in FIG. 15 are similar to that in FIG. 11, and therefore, the description thereof is omitted.

Figure 15:
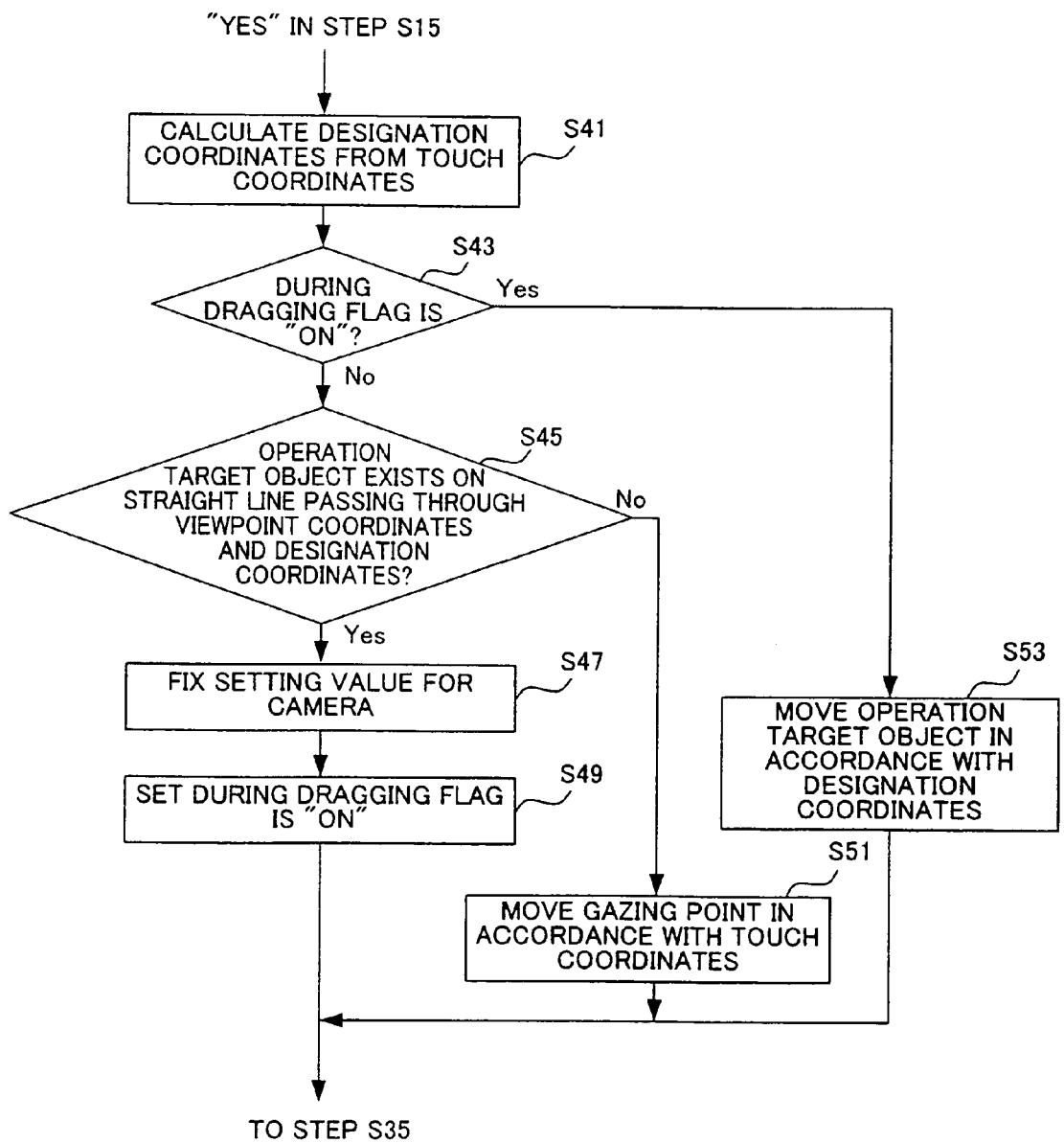
FIG. 15 is a flowchart illustrating a flow of a process for the CPU core 21 according to an alternative example.

When it is determined that the stick 16 is in contact with the touch panel 15 in step S15 of FIG. 11, the CPU core 21 calculates designation coordinates using the touch coordinates 42 in step S41 of FIG. 15, and stores the calculation result in the RAM 24.

In step S43, it is determined whether the during dragging flag is "on", and if the during dragging flag is "off" (indicating a situation immediately following the stick 16 being brought into contact with the touch panel 15), whether the operation target object CT2 exists on the straight line which passes through the viewpoint coordinates 40a and the designation coordinates 43 is determined.

If it is determined "YES" (indicating that the player touched the display area for the operation target object CT2 with the stick 16) in step S45, the setting values for the camera are fixed in step S47, followed by step S49 in which the during dragging flag is set to "on", and then the process proceeds to step S35 of FIG. 11. If it is determined "NO" (indicating that the player touched a location outside of the display area for the operation target object CT2 with the stick 16) in step S45, the gazing point is moved (namely, the gazing point coordinates 40b is updated) in accordance with the touch coordinates 42 in step S51, and thereafter, the process proceeds to step S35 of FIG. 11.

On the other hand, when it is determined that the during dragging flag is "on" (indicating that the player is in the dragging operation) in step S43, the operation target object CT2 is moved (namely, the coordinates for the operation target object CT2 are updated) in accordance with the designation coordinates 43 in step S53, and thereafter, the process proceeds to step S35 of FIG. 11.

Figure 14B:
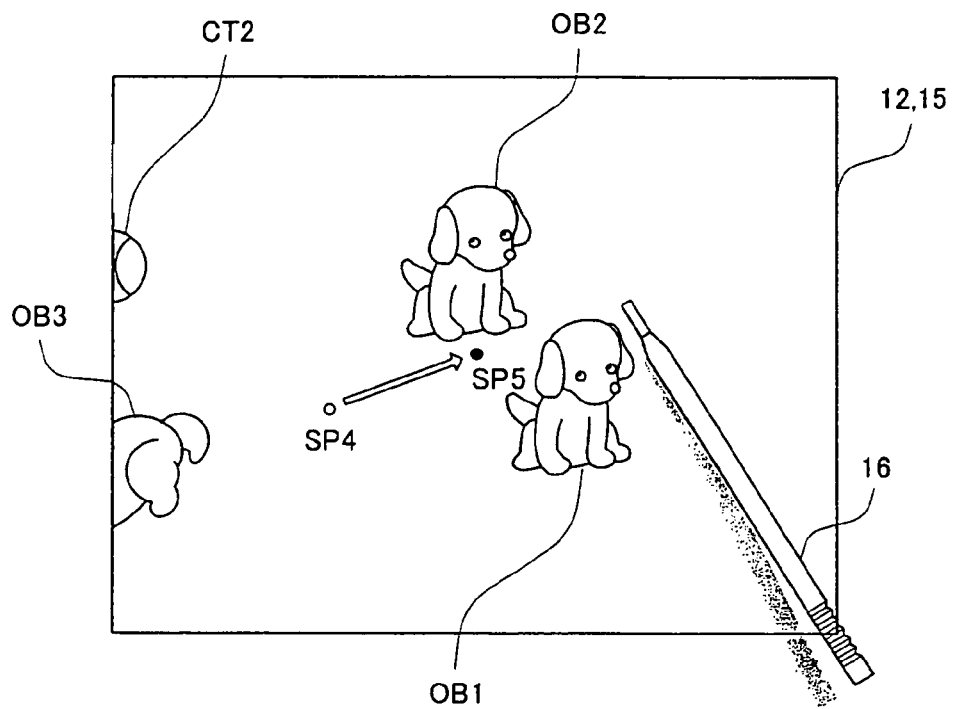
FIG. 14B is an exemplary game image immediately after a part other than the operation target object is touched.

In an example shown in FIG. 14B, when the player touches, with the stick 16, the location outside of the display area for the operation target object CT2, the gazing point of the virtual camera VC is moved to the designation coordinates, but the present invention is not limited thereto. For example, when the player touches, with the stick 16, the location outside of the display area for the operation target object CT2, the input operation may be ignored. In another example, a peripheral area of the touched position may be zoomed for display.

While the invention has been described in detail, the foregoing description is in all aspects illustrative and not restrictive. It is understood that numerous other modifications and variations can be devised without departing from the scope of the invention.

What is claimed is:

1. A non-transitory storage medium storing a game program for displaying, on a display device provided with a display, an object placed in a three dimensional game space based on a virtual camera provided in the game space, wherein the game program is configured to cause a computer at least to:

change a setting value for the camera, the value being indicative of a position and a gazing point of the virtual camera;

generate a game image to be displayed on the display device by drawing the object based on the setting value for the camera;

detect coordinates indicative of a position pointed to on the display;

fix, when the coordinates are detected while the setting value for the camera is changing, the position and the gazing point of the virtual camera at least until the detection for the coordinates stops, such that the object placed in the three dimensional game space is movable within the three dimensional game space and an orientation of the three dimensional game space is fixed during fixing; and, sequentially calculate, when the coordinates are changed, in a state where the setting value for the camera is fixed, three dimensional coordinates, in the game space, corresponding to the changed coordinates, and accept the outcome as designation coordinates designated by a player.

2. The non-transitory storage medium according to claim 1, wherein the game program is further configured to cause the computer to:
place, when the coordinates are detected while the setting value for the camera is changing, an operation target object on the three dimensional coordinates, in the game space, corresponding to the coordinates; and
move the operation target object in accordance with a change in the sequentially calculated designation coordinates.

3. The non-transitory storage medium according to claim 1, wherein the game program is further configured to cause the computer to calculate the designation coordinates by mapping each point on the display to a predetermined plane set in a view volume in the game space.

4. The non-transitory storage medium according to claim 1, wherein the game program is further configured to cause the computer to change the setting value for the camera per unit time, based on a predetermined computational expression.

5. The non-transitory storage medium according to claim 1, wherein the game image generated includes an image of the object within the three dimensional game space, and the image of the object moves within the three dimensional game space during at least during a portion of a time when the camera is fixed.

6. The non-transitory storage medium according to claim 5, wherein:
the setting value set also is indicative of an angle of view of the virtual camera, and
the fixing also fixes, when the coordinates are detected while the setting value for the camera is changing, the angle of view of the virtual camera at least until the detection for the coordinates stops, such that the object placed in the three dimensional game space is movable within the three dimensional game space and the orientation of the three dimensional game space is fixed during the fixing.

7. A non-transitory storage medium storing a game program for displaying, on a display device, an object placed in a three dimensional game space based on a virtual camera provided in the game space, wherein the game program is configured to cause a computer at least to:
change a setting value for the camera, the value being indicative of a position and a gazing point of the virtual camera;
generate a game image to be displayed on the display device by drawing the object based on the virtual camera;
detect coordinates indicative of a position pointed to on the display device;
determine whether, on a screen of the display device, an operation target object corresponding to the coordinates is displayed based on the detected coordinates;
fix, when the operation target object is determined as being displayed at a position, on a screen of the display device, corresponding to the coordinates while the setting value for the camera is changing, the position and the gazing point of the virtual camera at least until the detection for the coordinates stops, such that the object placed in the three dimensional game space is movable within the three dimensional game space and an orientation of the three dimensional game space is fixed during fixing;
sequentially calculate, when the coordinates are changed, in a state where the setting value for the camera is fixed, three dimensional coordinates, in the game space, corresponding to the changed coordinates, and accepting the outcome as designation coordinates designated by a player; and
update a position of the operation target object in the game space in accordance with a change in the sequentially calculated designation coordinates.

8. The non-transitory storage medium according to claim 7, wherein, the game program is further configured to cause the computer to change, when the operation target object is determined as not being displayed at the position, on the screen of the display device, corresponding to the coordinates while the setting value for the camera is changing, the setting value for the camera in accordance with the coordinates.

9. The non-transitory storage medium according to claim 7, wherein the game program is further configured to cause the computer to change the setting value for the camera per unit time, based on a predetermined computational expression.

10. The non-transitory storage medium according to claim 7, wherein the game image generated includes an image of the object within the three dimensional game space, and the image of the object moves within the three dimensional game space during at least during a portion of a time when the camera is fixed.

11. The non-transitory storage medium according to claim 7, wherein:
the setting value set also is indicative of an angle of view of the virtual camera, and
the fixing also fixes, when the coordinates are detected while the setting value for the camera is changing, the angle of view of the virtual camera at least until the detection for the coordinates stops, such that the object placed in the three dimensional game space is movable within the three dimensional game space and the orientation of the three dimensional game space is fixed during the fixing.

12. A method of displaying, on a display device, an object placed in a three dimensional game space based on a virtual camera provided in the game space, the method comprising:
changing a setting value for the camera, the value indicative of a position and a gazing point of the virtual camera;
generating a game image to be displayed on the display device by drawing the object based on the setting value for the camera;
detecting coordinates indicative of a position pointed to on the display device;
fixing, when the coordinates are detected while the setting value for the camera is changing, the position and the gazing point of the virtual camera at least until the detection for the coordinates stops, such that the object placed in the three dimensional game space is movable within the three dimensional game space and an orientation of the three dimensional game space is fixed during the camera fixing; and
sequentially calculating, when the coordinates are changed, in a state where the setting value for the camera is fixed, three dimensional coordinates, in the game space, corresponding to the changed coordinates, and accepting the outcome as designation coordinates designated by a player.

13. The method according to claim 12, further comprising:
placing, when the coordinates are detected while the setting value for the camera is changing, an operation target object on the three dimensional coordinates, in the game space, corresponding to the coordinates; and moving the operation target object in accordance with a change in the sequentially calculated coordinates.

14. The method according to claim 12, wherein said calculating the designation coordinates comprises calculating the designation coordinates corresponding to the detected coordinates by mapping each point on the display device to a predetermined plane set in a view volume in the game space.

15. The method according to claim 12, wherein said changing the setting value comprises changing the setting value for the camera per unit time, based on a predetermined computational expression.

16. The method according to claim 12, wherein the generated game image includes an image of the object within the three dimensional game space, and the image of the object moves within the three dimensional game space during at least during a portion of when the setting value for the camera, and hence the game image orientation, are fixed.

17. The method according to claim 12, wherein:
the setting value set also is indicative of an angle of view of the virtual camera, and
the fixing also fixes, when the coordinates are detected while the setting value for the camera is changing, the angle of view of the virtual camera at least until the detection for the coordinates stops, such that the object placed in the three dimensional game space is movable within the three dimensional game space and the orientation of the three dimensional game space is fixed during the fixing.

18. A method of displaying, on a display device, an object placed in a three dimensional game space based on a virtual camera provided in the game space, the method comprising:
changing a setting value for the camera, the value indicative of a position and a gazing point of the virtual camera;
generating a game image to be displayed on the display device by drawing the object based on the virtual camera;
detecting coordinates indicative of a position pointed to on the display device;
determining whether, on a screen of the display device, an operation target object corresponding to the coordinates is displayed based on the coordinates detected in the detecting of the coordinates;
fixing, when the operation target object is determined, in the determining, as being displayed at a position, on a screen of the display device, corresponding to the coordinates while the setting value for the camera is changing, the position and the gazing point of the virtual camera at least until the detection for the coordinates stops, such that the object placed in the three dimensional game space is movable within the three dimensional game space and an orientation of the three dimensional game space is fixed during the fixing;
sequentially calculating, when the coordinates are changed, in a state where the setting value for the camera is fixed, three dimensional coordinates, in the game space, corresponding to the changed coordinates, and accepting the outcome as designation coordinates designated by a player; and
updating a position of the operation target object in the game space in accordance with a change in the sequentially calculated designation coordinates.

19. The method according to claim 18, further comprising changing, when the operation target object is determined, in said determining, as not being displayed at the position, on the screen of the display device, corresponding to the coordinates while the setting value for the camera is changing, the setting value for the camera in accordance with the coordinates.

20. The method according to claim 18, wherein said changing the setting value comprises changing the setting value for the camera per unit time, based on a predetermined computational expression.

21. The method according to claim 18, wherein the generated game image includes an image of the object within the three dimensional game space, and the image of the object moves within the three dimensional game space during at least during a portion of when the setting value for the camera, and hence the game image orientation, are fixed.

22. The method according to claim 18, wherein:
the setting value set also is indicative of an angle of view of the virtual camera, and
the fixing also fixes, when the coordinates are detected while the setting value for the camera is changing, the angle of view of the virtual camera at least until the detection for the coordinates stops, such that the object placed in the three dimensional game space is movable within the three dimensional game space and the orientation of the three dimensional game space is fixed during the fixing.

23. A system comprising a display and at least one processor configured to execute a game program that, when executed by the at least one processor, causes an object placed in a three dimensional game space to be displayed on the display based on a virtual camera provided in the game space, wherein the game program is further configured, when executed, to at least:
change a setting value for the camera, the value being indicative of a position and a gazing point of the virtual camera;
generate a game image to be displayed on the display device by drawing the object based on the setting value for the camera;
detect coordinates indicative of a position pointed to on the display;
fix, when the coordinates are detected while the setting value for the camera is changing, the position and the gazing point of the virtual camera at least until the detection for the coordinates stops, such that the object placed in the three dimensional game space is movable within the three dimensional game space and an orientation of the three dimensional game space is fixed during fixing; and,
sequentially calculate, when the coordinates are changed, in a state where the setting value for the camera is fixed, three dimensional coordinates, in the game space, corresponding to the changed coordinates, and accept the outcome as designation coordinates designated by a player.

24. An apparatus comprising a display and at least one processor configured to execute a game program that, when executed by the at least one processor, causes an object placed in a three dimensional game space to be displayed on the display based on a virtual camera provided in the game space, wherein the game program is further configured, when executed, to at least:
change a setting value for the camera, the value being indicative of a position and a gazing point of the virtual camera;
generate a game image to be displayed on the display device by drawing the object based on the setting value for the camera;
detect coordinates indicative of a position pointed to on the display;

fix, when the coordinates are detected while the setting value for the camera is changing, the position and the gazing point of the virtual camera at least until the detection for the coordinates stops, such that the object placed in the three dimensional game space is movable within the three dimensional game space and an orientation of the three dimensional game space is fixed during fixing; and, sequentially calculate, when the coordinates are changed, in a state where the setting value for the camera is fixed, three dimensional coordinates, in the game space, corresponding to the changed coordinates, and accept the outcome as designation coordinates designated by a player.

25. A system comprising a display and at least one processor configured to execute a game program that, when executed by the at least one processor, causes an object placed in a three dimensional game space to be displayed on the display based on a virtual camera provided in the game space, wherein the game program is further configured, when executed, to at least:

change a setting value for the camera, the value being indicative of a position and a gazing point of the virtual camera;

generate a game image to be displayed on the display device by drawing the object based on the virtual camera;

detect coordinates indicative of a position pointed to on the display device;

determine whether, on a screen of the display device, an operation target object corresponding to the coordinates is displayed based on the detected coordinates;

fix, when the operation target object is determined as being displayed at a position, on a screen of the display device, corresponding to the coordinates while the setting value for the camera is changing, the position and the gazing point of the virtual camera at least until the detection for the coordinates stops, such that the object placed in the three dimensional game space is movable within the three dimensional game space and an orientation of the three dimensional game space is fixed during fixing;

sequentially calculate, when the coordinates are changed, in a state where the setting value for the camera is fixed, three dimensional coordinates, in the game space, corresponding to the changed coordinates, and accepting the outcome as designation coordinates designated by a player; and update a position of the operation target object in the game space in accordance with a change in the sequentially calculated designation coordinates.

26. An apparatus comprising a display and at least one processor configured to execute a game program that, when executed by the at least one processor, causes an object placed in a three dimensional game space to be displayed on the display based on a virtual camera provided in the game space, wherein the game program is further configured, when executed, to at least:

change a setting value for the camera, the value being indicative of a position and a gazing point of the virtual camera;

generate a game image to be displayed on the display device by drawing the object based on the virtual camera;

detect coordinates indicative of a position pointed to on the display device;

determine whether, on a screen of the display device, an operation target object corresponding to the coordinates is displayed based on the detected coordinates;

fix, when the operation target object is determined as being displayed at a position, on a screen of the display device, corresponding to the coordinates while the setting value for the camera is changing, the position and the gazing point of the virtual camera at least until the detection for the coordinates stops, such that the object placed in the three dimensional game space is movable within the three dimensional game space and an orientation of the three dimensional game space is fixed during fixing;

sequentially calculate, when the coordinates are changed, in a state where the setting value for the camera is fixed, three dimensional coordinates, in the game space, corresponding to the changed coordinates, and accepting the outcome as designation coordinates designated by a player; and update a position of the operation target object in the game space in accordance with a change in the sequentially calculated designation coordinates.

* * * * *